US009870637B2

(12) United States Patent
Anderson et al.

(10) Patent No.: US 9,870,637 B2
(45) Date of Patent: Jan. 16, 2018

(54) FRAME REMOVAL AND REPLACEMENT FOR STOP-ACTION ANIMATION

(71) Applicant: Intel Corporation, Santa Clara, CA (US)

(72) Inventors: Glen J. Anderson, Beaverton, OR (US); Kathy Yuen, Portland, OR (US); Omesh Tickoo, Portland, OR (US); Jamie Sherman, Portland, OR (US); Jeffrey Ota, Morgan Hill, CA (US); Ravishankar R. Iyer, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 13 days.

(21) Appl. No.: 14/575,742

(22) Filed: Dec. 18, 2014

(65) Prior Publication Data

US 2016/0180571 A1 Jun. 23, 2016

(51) Int. Cl.
*G06T 13/80* (2011.01)
*G11B 27/00* (2006.01)

(52) U.S. Cl.
CPC .............. *G06T 13/80* (2013.01); *G11B 27/00* (2013.01)

(58) Field of Classification Search
CPC ......... H04N 5/23277; H04N 21/23418; H04N 5/23245; H04N 9/7921; H04N 1/212; H04N 1/2112; H04N 5/783; H04N 21/41407; H04N 21/2187; H04N 21/440281; H04N 21/854; H04N 1/2116; G06T 13/80; G06T 1/0007; G06T 2207/10016; G06T 7/2006; G06T 5/005; G06T 13/00; G06T 2207/30221; G06T 7/0002; G06T 7/0071; G06T 2207/30261; G06K 9/00375; G06F 17/30843; G06F 19/3437
See application file for complete search history.

(56) References Cited

U.S. PATENT DOCUMENTS

| 2003/0190143 | A1* | 10/2003 | Girgensohn | G11B 27/034 |
| | | | | 386/241 |
| 2006/0077263 | A1* | 4/2006 | Hosoda | H04N 5/232 |
| | | | | 348/222.1 |
| 2011/0080424 | A1* | 4/2011 | Peters | H04N 1/387 |
| | | | | 345/620 |

(Continued)

*Primary Examiner* — Haixia Du
(74) *Attorney, Agent, or Firm* — Schwegman Lundberg & Woessner, P.A.

(57) ABSTRACT

Various systems and methods for frame removal and replacement for stop-action animation are described herein. A system for creating a stop-motion video includes an access module to access a series of frames of an input video, and a processing module to determine whether each frame of the series of frames includes a portion of a hand and composite frames from the series of frames that do not include the portion of the hand to render an output video. A system for creating a video includes an access module to access an input video, and a video processing module to identify a physical object in the input video, track movement of the physical object in the input video to identify a path, identify a three-dimensional model of the physical object, and create an output video with the three-dimensional model in place of the physical object, the three-dimensional model following the path.

9 Claims, 7 Drawing Sheets

(56) References Cited

U.S. PATENT DOCUMENTS

| | | | |
|---|---|---|---|
| 2011/0235905 A1* | 9/2011 | Yokokawa | H04N 1/40068 382/165 |
| 2013/0342671 A1* | 12/2013 | Hummel | G06K 9/6202 348/77 |
| 2014/0026051 A1* | 1/2014 | Roh | G06F 3/0484 715/720 |
| 2014/0132758 A1* | 5/2014 | Saptharishi | H04N 7/18 348/135 |
| 2014/0211991 A1* | 7/2014 | Stoppa | G06K 9/00355 382/103 |
| 2015/0042795 A1* | 2/2015 | Tsuria | A63F 13/10 348/143 |
| 2016/0063750 A1* | 3/2016 | Bhargava | G06T 13/20 345/473 |

* cited by examiner

FRAME REMOVAL AND REPLACEMENT FOR STOP-ACTION ANIMATION

TECHNICAL FIELD

Embodiments described herein generally relate to media capture and in particular, to frame removal and replacement for stop-action animation.

BACKGROUND

Stop-motion animation is an animation technique to a make a stationary real-world object appear to move. The object may be moved in small increments between individually photographed frames. When the frames are shown in quick succession, the object appears to move.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Systems and methods described herein provide frame removal and replacement for stop-action animation. Stop-motion animation created by traditional methods include the laborious task of moving one or more physical pieces in a set, taking a picture, and repeating this process to construct the animation needed in a particular scene. With the widespread availability of digital cameras, more people are able to create stop-motion animation. However, even with digital cameras that are able to capture thousands of images, the physical acts of arranging the physical pieces and incrementally moving these pieces are still a large barrier to creating stop-motion animation.

To address these difficulties, the present disclosure describes several ways to create stop-motion animation using video. Instead of having a user maneuver an object and repeatedly take pictures, a user may move an object while recording a video and the video capture device may remove video frames that include the user's arm or hand Thus, by retaining the video frames that do not include the user's arm, hand, or other apparatus to maneuver the objects in the scene, the output approximates a stop-frame animation.

Another mechanism to create animations includes the use of a 3D model. A video is recorded with a placeholder object and in post-processing, the placeholder object is replaced with the 3D model. The resulting video may be further post-processed to create a stop-frame animation effect.

Figure 1:
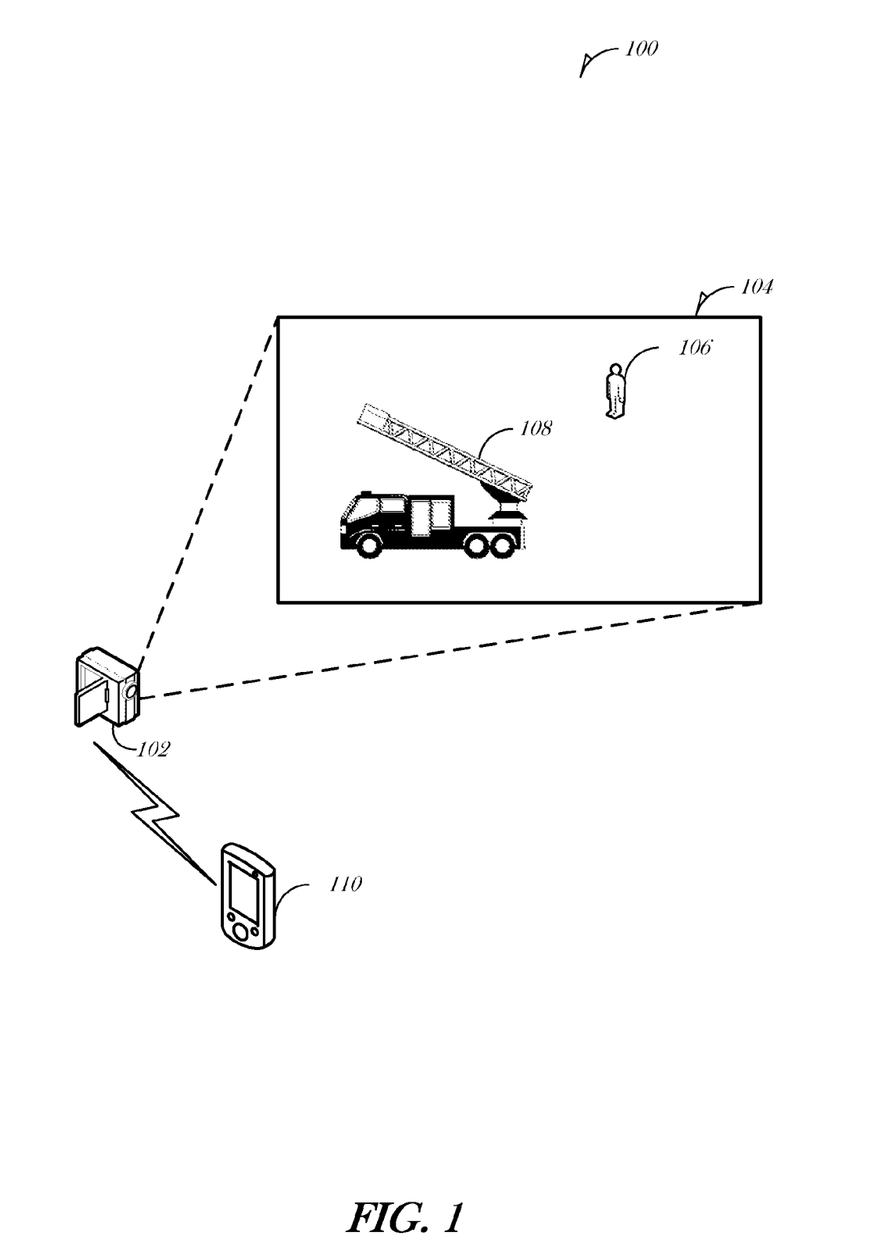
FIG. 1 is a schematic drawing illustrating an environment to create stop-motion animation, according to an embodiment.

FIG. 1 is a schematic drawing illustrating an environment 100 to create stop-motion animation, according to an embodiment. The environment 100 includes a camera 102 with a field of view 104, and several objects 106 and 108 in the field of view 104. The objects 106 and 108 may include any type of object, such as action figures, toy cars or trucks, stuffed animals, clay figures, office supplies, plants, etc. The objects 106 and 108 may be manipulated by a user (not shown) to create a video.

The camera 102 may be a standalone camera or a camera integrated into another device, such as a smartphone or a table computer. The camera 102 may be incorporated into a wearable device, such as a glasses-based device, or may be a standalone camera simply attached to a person's hand or head with an elastic strap. The camera 102 may operate to process the images to render an output stop-motion video. Alternatively, the camera 102 may be communicatively coupled to another device 110, which performs the image processing. The device 110 may be any type of computing device, such as a desktop, laptop, hybrid, smartphone, tablet, or the like. The camera 102 and device 110 may be coupled by wired or wireless connections, such as with a universal serial bus (USB) connection, Bluetooth, or the like. Although only one camera 102 is shown in FIG. 1, it is understood that several cameras may be used, for example, to capture several camera angles and compose a more complex output video.

In operation, the user arranges the objects 106 and 108 within the framed scene and then begins recording video with the camera 102. The camera 102 has an operational field of view 104 and captures the framed scene. The user is free to move one or more objects 106 and 108, in small or large amounts. The camera 102 (or the device 110) may detect when the user's hand (or other mechanism used to move the objects 106 and 108) is in the field of view 104. The user may move the objects 106 and 108 with their hand or other portion of their body. The user may also move the objects 106 and 108 with various move mechanisms or apparatus, such as a pointer, a grabber tool, a prosthetic, or the like. The camera 102 or device 110 discards the video frames that have the user's hand or other mechanism in the field of view 104. The remaining frames are those without the hand or other movement mechanism, resulting in a video where the inanimate objects appear to move.

The video processing may be performed substantially concurrently at the time of recording, e.g., during video capture. In such a configuration, the user may be able to record more stop-action video before running out of storage space because video frames with hands or other mechanisms to move objects in the scene are not stored.

In another configuration, the video may be recorded and then later processed. For example, the video may be recorded on the camera 102 and then a video file (e.g., an .mp4 file) is copied to the device 110 for processing. At the device 110, the video is analyzed frame-by-frame and those frames that include a hand, or a portion of a hand, (or other moving mechanism) are removed. The frames that remain are then stitched together to form an output video. Because of the non-fluid movement of the objects in the output video, the output video resembles a stop-motion video.

Figure 2:
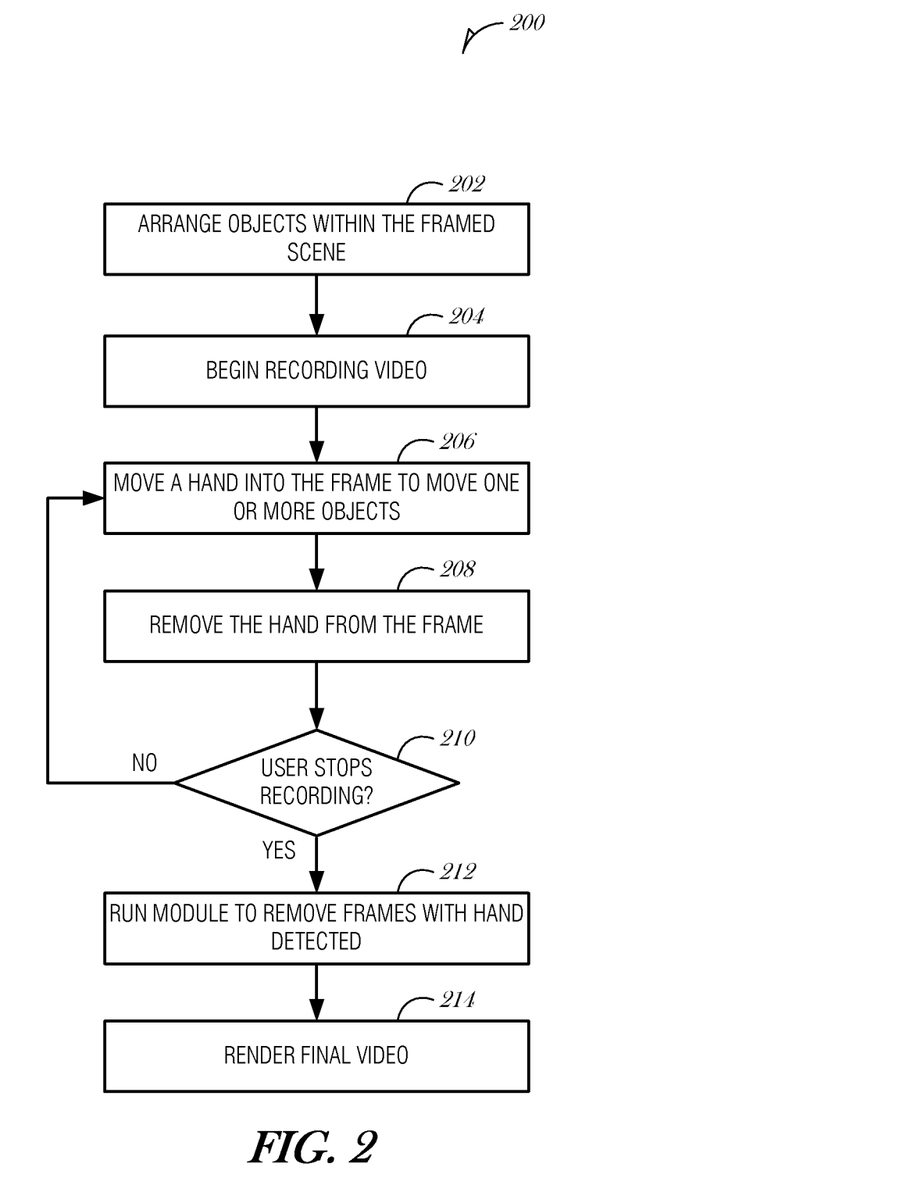
FIG. 2 is a flowchart illustrating the operational flow as discussed with respect to FIG. 1, according to an embodiment.

FIG. 2 is a flowchart illustrating the operational flow 200 as discussed with respect to FIG. 1, according to an embodiment. At block 202, the user or other people arrange objects within the scene. The objects may be arranged in an initial position, for example at the beginning of an animation sequence. At block 204, the video recording begins. During the recording, the user or other people may move the objects. By doing do, the people may move a hand (or hands) into the frame to move one or more of the objects, or portions of the objects (block 206). For example, the user may move an arm of an action figure or move the position of a truck to simulate movement from frame-to-frame. At block 208, the user removes their hand from the frame. At decision block 210, it is determined whether the user stops recording. If the user does not stop and continues to record, then the flow 200 moves to block 206 and the user may manipulate or move objects in the frame. The user may continue to move objects making sure to remove their hand from the frame between each movement (blocks 206, 208, 210) until the animation is complete. At that point, the user may stop recording and the flow 200 moves to block 212, where a module is used to remove frames that have a hand (or a portion of a hand) in-frame. Hand recognition may be performed by various techniques including, but not limited to skin tone detection, shape analysis, edge detection, motion analysis, complexity analysis, combinations of these techniques, or the like. At block 214, the final video is rendered where the frames without hands are stitched together to compose a video that shows the objects moving without apparent help. Users may subsequently add voice-overs, sound effects, etc. to the final video or change timing between frames in the final video.

This approach may also be used in concert with traditional stop-action animation. For example, while video recording the user may provide a command (e.g., a voice command) that would change the video recording device to photo-taking mode. In the photo-taking mode, the camera is used to capture single frames (or images). While in this mode, the user may provide a command to capture an image/frame. Thus, the typical flow of maneuvering the object(s), taking a picture, and repeating may be used to provide more control over animation. At a later time, the user may provide another command (e.g., a different voice command) to go back into video mode. The individual frames may then be stitched into the final video at block 214.

In some embodiments, the system may initially have multiple video segments to composite. Each of these segments may be composed of multiple frames of continuous video in which the hand is not present. The system may retain one frame from each segment to represent each segment instead of retaining all of the video frames within each segment. This will allow the system to have more even timing of object movements for the final video rendering, even if the user does not keep the hand outside of the frame for an equal period of time during each segment. This approach will also reduce shadows that may appear and vary across continuous frames. Such shadows may be created when the user has the hand outside of the frame but partially blocking a light source. Uneven timing of object movements and shadows may be undesirable in the final video.

By using the video camera in a different way, the user is provided a relatively easy mechanism to produce stop-motion animation. Such mechanisms may be attractive to novice users (e.g., kids), amateur film makers, or hobbyists.

Figure 3:
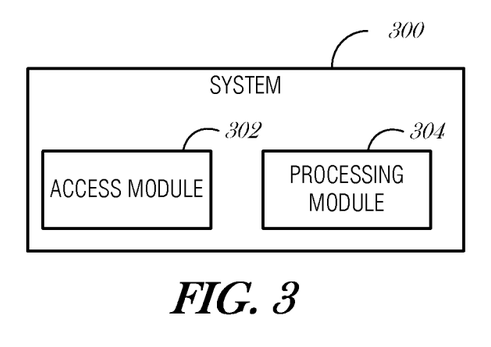
FIG. 3 is a block diagram illustrating a system for creating a stop-motion video, according to an embodiment.

FIG. 3 is a block diagram illustrating a system 300 for creating a stop-motion video, according to an embodiment. The system 300 includes an access module 302 and a processing module 304. The access module 302 may be configured to access a series of frames of an input video. In an embodiment, to access the series of frames of the input video, the access module 302 is to access the series of frames while the input video is being recorded. In such an embodiment, the processing module 304 may be configured to pause the recording of the input video, obtain a first image, obtain a second image after the first image, where the first and second images used as a portion of the output video, and resume the recording of the input video. This mechanism combines traditional stop-motion animation techniques with a video-based technique and may provide more fine-tuned control over the animation process.

The processing module 304 may be configured to determine whether each frame of the series of frames includes a portion of a move mechanism and composite frames from the series of frames that do not include the portion of the move mechanism to render an output video. In an embodiment, the move mechanism is a hand In other embodiments, the move mechanism may be a tool, a prosthetic, or part of the body other than a hand (e.g., a foot).

In some embodiments, the system may detect frames with the hand present while the video continues to be recorded. In some embodiments, the move mechanism is a hand and the system may delete all frames with the hand present immediately after recording but while the system continues to record new video (e.g., delete frames from a buffer before writing to more long-term storage). In some embodiments, the system may delete all but one of the frames from each video segment in which a hand is not present while the system continues to record video.

In an embodiment, the move mechanism is a hand and to determine whether each frame of the series of frames includes the portion of the hand, the processing module 304 is to identify the portion of the hand by recognizing a skin tone and determine that a particular frame of the series of frames includes the portion of the hand based on the skin tone. The system may be initialized with a particular skin tone or a range of skin tones. For example, the user may be prompted to place their hand or arm in front of the camera during an initialization process. Thus, in an embodiment, the processing module 304 is to initialize the skin tone by analyzing an image of the hand.

In addition to skin tone analysis, the system 300 may also detect a hand or the move mechanism by using motion analysis. By analyzing an image from frame-to-frame, motion of one or more objects in the image may be detected. If the object in motion also has a skin tone, then the object may be a hand or arm of a person arranging the other objects in the scene. Thus, in an embodiment, the move mechanism is a hand and to determine whether each frame of the series of frames includes the portion of the hand, the processing module 304 is to detect motion of an object between two consecutive frames from the series of frames, determine that the object has a color similar to a skin tone, and determine that a particular frame of the series of frames includes the portion of the hand based on the skin tone.

The system may also use motion detection by itself, without skin detection, to allow the deletion of any frame in which motion is occurring. The system may require that motion apparently ceases for more than one frame to increase the likelihood that the hand is not present. In some embodiments, motion detection may be accomplished through background subtraction, which is well known in the field of video analysis. In some embodiments background segmentation may be used to determine the stationary elements of the scene before the user places a hand within the frame of the camera. While the hand is in the frame of camera, the user will typically move the hand, thus allowing the system to determine that motion is occurring. Once the hand is removed from the scene the system will once again determine the scene is static through the use of background subtraction. Segments of video in which the system determines the scene is static will be retained for compositing.

In some cases, the camera may be moving and as a result everything in the scene appears to move when looking frame-to-frame. This type of movement should not be flagged as hand motion. Thus, in an embodiment, the processing module 304 is to ignore motion between two consecutive frames when the motion is a result of a camera movement. Such movement of the camera may be detected through accelerometer data from the device that contains the camera, or camera movement may be determined through methods of video analysis.

Another mechanism that may be used to detect the presence of a hand or a move mechanism in a frame is by object counting or tracking. Assume for example that there are three objects in a frame: a toy car, an action figure, and a toy building. The objects may be detected using shape detection or other methods. When the user places their hand or another tool into the frame to adjust one or more of these objects, the user's hand is detected as a "fourth object." The introduction of another object may be used to detect a hand in frame. Thus, in an embodiment, to determine whether each frame of the series of frames includes the portion of the hand, the processing module is to determine a baseline number of objects in a scene captured by the series of frames and identify a frame from the series of frames that includes more objects than the baseline number of objects. In some cases, the introduction of another object is intentional (e.g., another action figure walking into view). Thus, the object tracking mechanism may be combined with a skin tone detection mechanism to increase the accuracy of hand detection.

Another mechanism that may be used to detect hand presence is visual complexity. Visual complexity may refer to the number or variance of objects, colors, elements, or other aspects of an image. In an embodiment, to determine whether each frame of the series of frames includes the portion of the hand, the processing module 304 is to determine a baseline complexity in a scene captured by the series of frames and identify a frame from the series of frames that includes more complexity than the baseline complexity. In a further embodiment, the baseline complexity is a color complexity.

Figure 4:
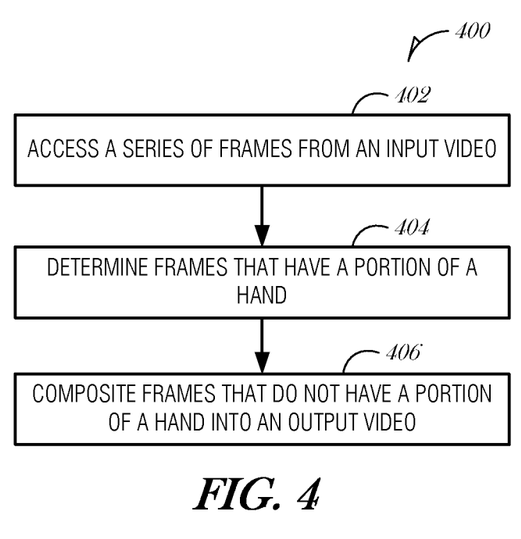
FIG. 4 is a flowchart illustrating a method of creating a stop-motion video, according to an embodiment.

FIG. 4 is a flowchart illustrating a method 400 of creating a stop-motion video, according to an embodiment. At block 402, a series of frames of an input video are accessed at a computing device. In an embodiment, accessing the series of frames of the input video is performed while the input video is being recorded. In an embodiment, the method 400 includes pausing the recording of the input video, capturing a first image, capturing a second image after the first image, where the first and second images used as a portion of the output video, resuming the recording of the input video.

At block 404, it is determined whether each frame of the series of frames includes a portion of a move mechanism. In an embodiment, the move mechanism is a hand In an embodiment, the move mechanism is a hand and determining whether each frame of the series of frames includes the portion of the hand comprises identifying the portion of the hand by recognizing a skin tone and determining that a particular frame of the series of frames includes the portion of the hand based on the skin tone. In a further embodiment, the method 400 includes initializing the skin tone by analyzing an image of the hand In an embodiment, the move mechanism is a hand and determining whether each frame of the series of frames includes the portion of the hand comprises detecting motion of an object between two consecutive frames from the series of frames, determining that the object has a color similar to a skin tone, and determining that a particular frame of the series of frames includes the portion of the hand based on the skin tone. In an embodiment, the method 400 includes ignoring motion between two consecutive frames when the motion is a result of a camera movement.

In an embodiment, the move mechanism is a hand and determining whether each frame of the series of frames includes the portion of the hand comprises determining a baseline number of objects in a scene captured by the series of frames, and identifying a frame from the series of frames that includes more objects than the baseline number of objects.

In an embodiment, the move mechanism is a hand and determining whether each frame of the series of frames includes the portion of the hand comprises determining a baseline complexity in a scene captured by the series of frames and identifying a frame from the series of frames that includes more complexity than the baseline complexity. In a further embodiment, the baseline complexity is a color complexity.

At block 406, frames from the series of frames that do not include the portion of the move mechanism are composited to render an output video.

Figure 5:
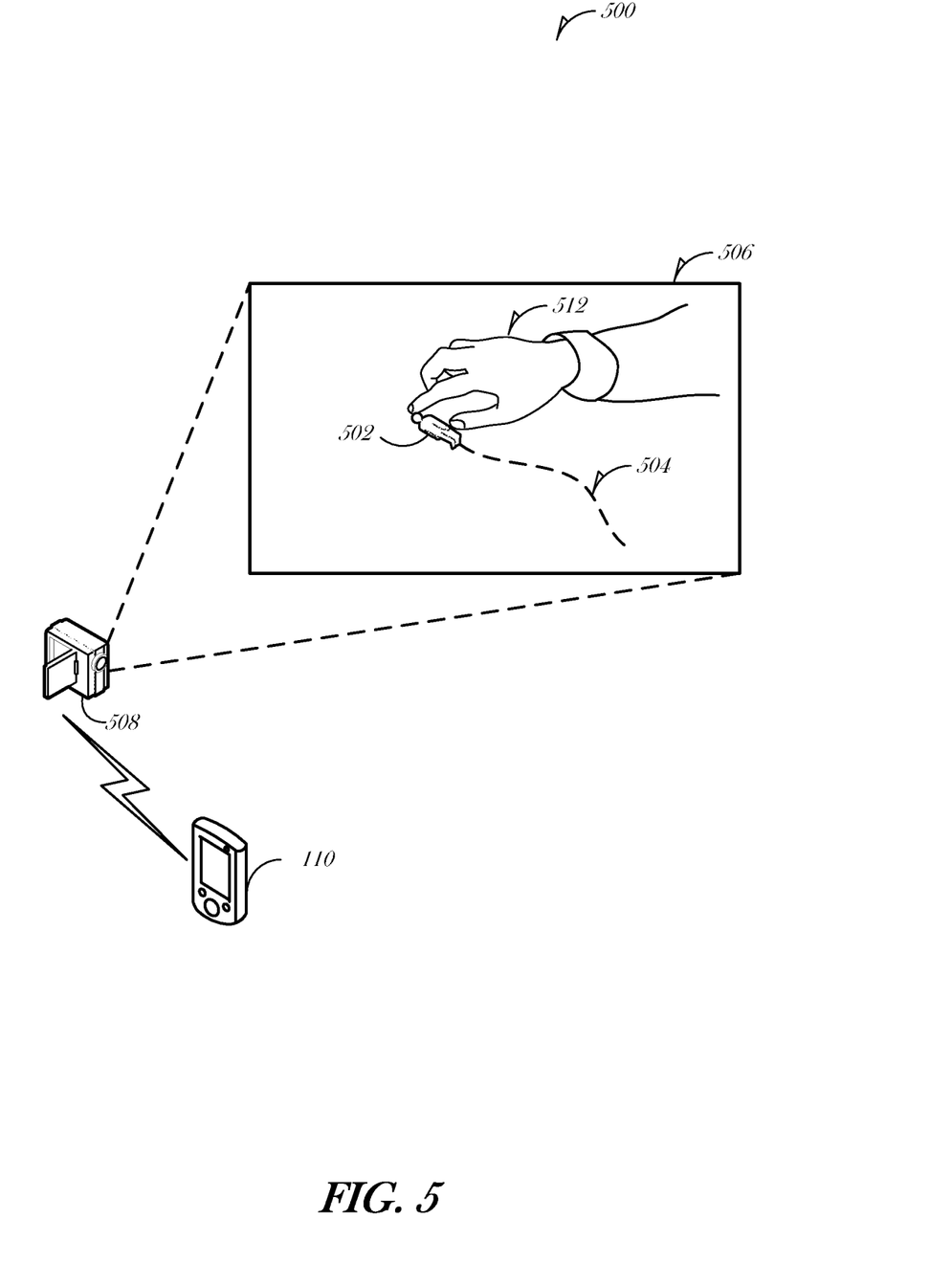
FIG. 5 is a schematic drawing illustrating an environment to create a video, according to an embodiment.

Another mechanism to create videos is discussed in reference to FIGS. 5-8. FIG. 5 is a schematic drawing illustrating an environment 500 to create a video, according to an embodiment. In FIG. 5, a user is illustrated moving a physical object 502 along a path 504 in a field of view 506 of a camera 508 using a hand 512. The camera 508 may be a standalone device or incorporated into another device (e.g., a smartphone). The camera 508 may communicate with a processing device 510. The processing device 510 may be any type of computing device, such as a desktop, laptop, tablet, hybrid, smartphone, mobile device, or the like. Video processing may be performed at the camera 508 or processing device 510. As the user moves the physical object 502, the camera 508 records the action. After the user is completed with the video capture, the user may initiate video processing at the camera 508 or the processing device 510. The video processing is used to replace the physical object 502 in the video with a three-dimensional model. The three-dimensional model may be manipulated to follow the path 504 of the physical object 502 in the video.

In one example, the three-dimensional object is overlaid on top of the physical object 502 to obtain an output video with the three-dimensional model in place of the physical object 502. The user's hand 512 may be masked out in the output video so that the three-dimensional model appears to move without apparent support. The orientation and articulation of the physical object 502 may be mimicked by the three-dimensional model. For example, if the user moves the arms of the physical object 502, turns the physical model 502 from side to side, or changes the orientation of the physical model 502 (e.g., flies the model up and down, or to and away from the camera), the output video will include the three-dimensional model performing similar movements. In some embodiments, in the final video, the three-dimensional model may be overlaid over at least part of the background in the original video.

The three-dimensional model may be obtained by the user in various ways. For example, when the user buys a physical object 502, the user may be provided a copy of the three-dimensional model on a storage device (e.g., USB drive) in the packaging with the physical object 502. The three-dimensional model in this case may be professionally designed and provided by the producer of the physical object 502. As another example, the user may generate the three-dimensional model from the physical object 502, such as with an application executing on the camera 508 or the processing device 510. For example, the user may present the physical object 502 to the camera 508 and slowly rotate the physical object 502 so that the camera 508 is able to capture the details of the physical object 502 and render a three-dimensional model for use in videos. As yet another example, the user may download a three-dimensional model from various sources, such as a producer's website (e.g., a toy manufacturer's website) or from a fan website (e.g., fan-produced models).

Figure 6:
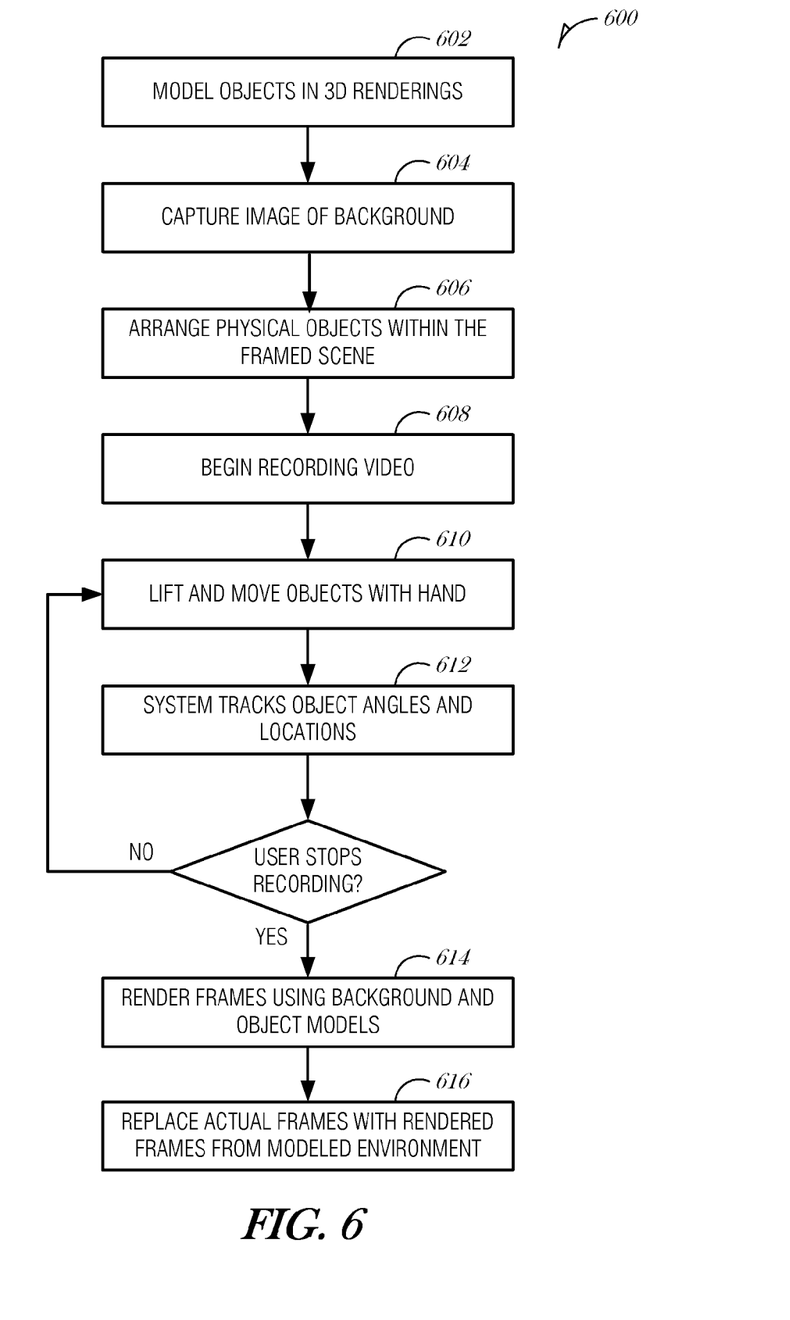
FIG. 6 is a flowchart illustrating the operational flow as discussed with respect to FIG. 5, according to an embodiment.

FIG. 6 is a flowchart illustrating the operational flow 600 as discussed with respect to FIG. 5, according to an embodiment. At block 602, objects are modeled in three-dimensions. The objects may be modeled by the producer or seller of the object. For example, a toy manufacturer may model the object in 3D and then provide the 3D model with the toy in the same packaging or as downloadable content. At block 604, an image of a background is captured. The image may be captured before recording the video or may be obtained from a frame in the video. At block 606, physical objects are arranged within a framed scene. At block 608, the video recording begins. The user is able to move the physical object while the video records (block 610) and the system tracks the objects as they move (block 612) until the user stops recording. When the user stops recording the frames are rendered using the background image (block 614) and the physical objects are replaced with the 3D model obtained in block 602 (block 616). The actual video frames captured in blocks 610-612 are replaced with the rendered frames with the background and the 3D model moving through the path captured during recording. In another embodiment, the 3D model is moved through the path captured during recording, and overlaid on the background captured during recording. In such an embodiment, the user's hand or other mechanism used to move the physical object through the path is masked out of the output video.

Figure 7:
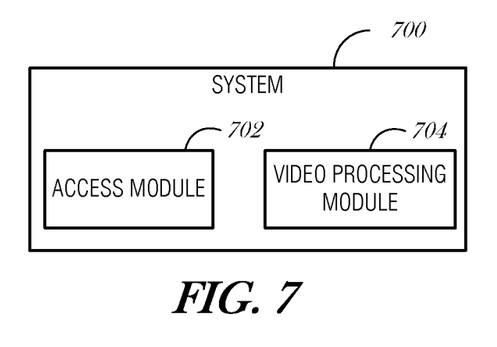
FIG. 7 is a block diagram illustrating a system for creating a video, according to an embodiment.

FIG. 7 is a block diagram illustrating a system 700 for creating a video, according to an embodiment. The system 700 includes an access module 702 and a video processing module 704. The access module 702 may be configured to access an input video. The video may be stored in local or remote storage.

The video processing module 704 may be configured to identify a physical object in the input video, track movement of the physical object in the input video to identify a path, identify a three-dimensional model of the physical object, and create an output video with the three-dimensional model in place of the physical object, the three-dimensional model following the path.

In an embodiment, to identify the physical object in the input video, the video processing module 704 is to prompt a user to hold the physical object and capture an image of the physical object. Once identified, the system 700 is then able to track the correct physical object for later processing.

In an embodiment, to track movement of the physical object the video processing module 704 is to track orientation of the physical object. The orientation may be tracked using various methods, such as identifying edges, key points, or other distinguishing aspects of the physical object. The orientation may be tracked by affixing another object, such as a cube, on the physical object to assist the path tracking and orientation tracking. Thus, in an embodiment, to track orientation of the physical object, the video processing module 704 is to identify a key point on the physical object and track the key point.

In an embodiment, to identify the three-dimensional model of the physical object, the video processing module 704 is to prompt a user to identify the three-dimensional model and receive an identification of the three-dimensional model from the user. The user may provide a filename, a location (e.g., a uniform resource locator (URL)), a serial number, or other identification.

In an embodiment, to identify the three-dimensional model of the physical object, the video processing module 704 is to identify the three-dimensional model of the physical object automatically based on the identifying the physical object in the input video. For example, the system 700 may perform image analysis and identify the specific object, and then reference a library of 3D models that are available for video creation.

In an embodiment, to create an output video with the three-dimensional model in place of the physical object, the video processing module 704 is to identify a background image and render the three-dimensional model over the background image following the path.

In an embodiment, to create an output video with the three-dimensional model in place of the physical object, the video processing module 704 is to identify a portion of a hand in the input video and mask the portion of the hand in the output video. The hand may be identified using skin tone analysis, shape analysis, edge detection, or the like.

Figure 8:
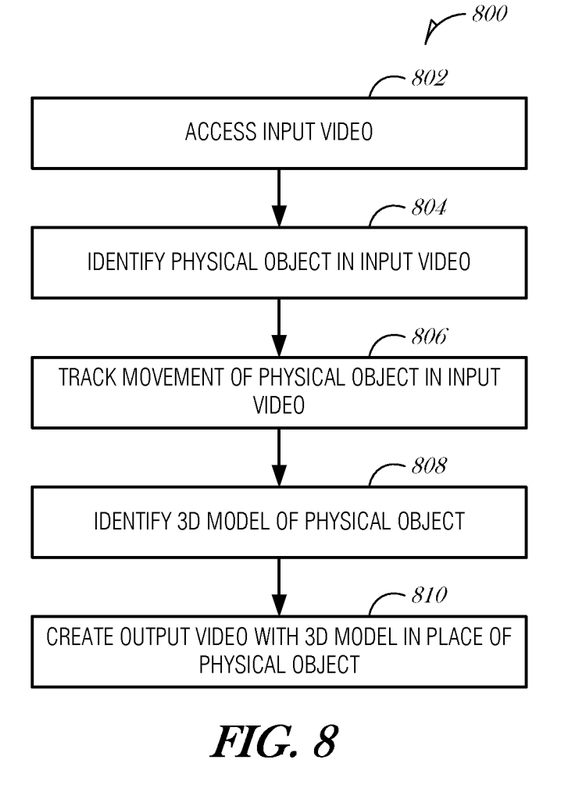
FIG. 8 is a flowchart illustrating a method of creating a video, according to an embodiment.

FIG. 8 is a flowchart illustrating a method 800 of creating a video, according to an embodiment. At block 802, an input video is accessed at a computing device. The computing device may be any type of device, including but not limited to a laptop, desktop, smartphone, hybrid device, tablet, or the like. The input video may be accessed from local storage or from remote storage.

At block 804, a physical object is identified in the input video. In an embodiment, identifying the physical object in the input video comprises prompting a user to hold the physical object and capturing an image of the physical object.

At block 806, movement of the physical object is tracked in the input video to identify a path. In an embodiment, tracking movement of the physical object comprises tracking orientation of the physical object. In a further embodiment, tracking orientation of the physical object comprises identifying a key point on the physical object and tracking the key point.

At block 808, a three-dimensional model of the physical object is identified. In an embodiment, identifying the three-dimensional model of the physical object comprises prompting a user to identify the three-dimensional model and receiving an identification of the three-dimensional model from the user.

In an embodiment, identifying the three-dimensional model of the physical object comprises identifying the three-dimensional model of the physical object automatically based on the identifying the physical object in the input video.

At block 810, an output video with the three-dimensional model in place of the physical object is created, where the three-dimensional model follows the path. In an embodiment, creating an output video with the three-dimensional model in place of the physical object comprises identifying a background image and rendering the three-dimensional model over the background image following the path. In an embodiment, creating an output video with the three-dimensional model in place of the physical object comprises identifying a portion of a hand in the input video and masking the portion of the hand in the output video.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 9:
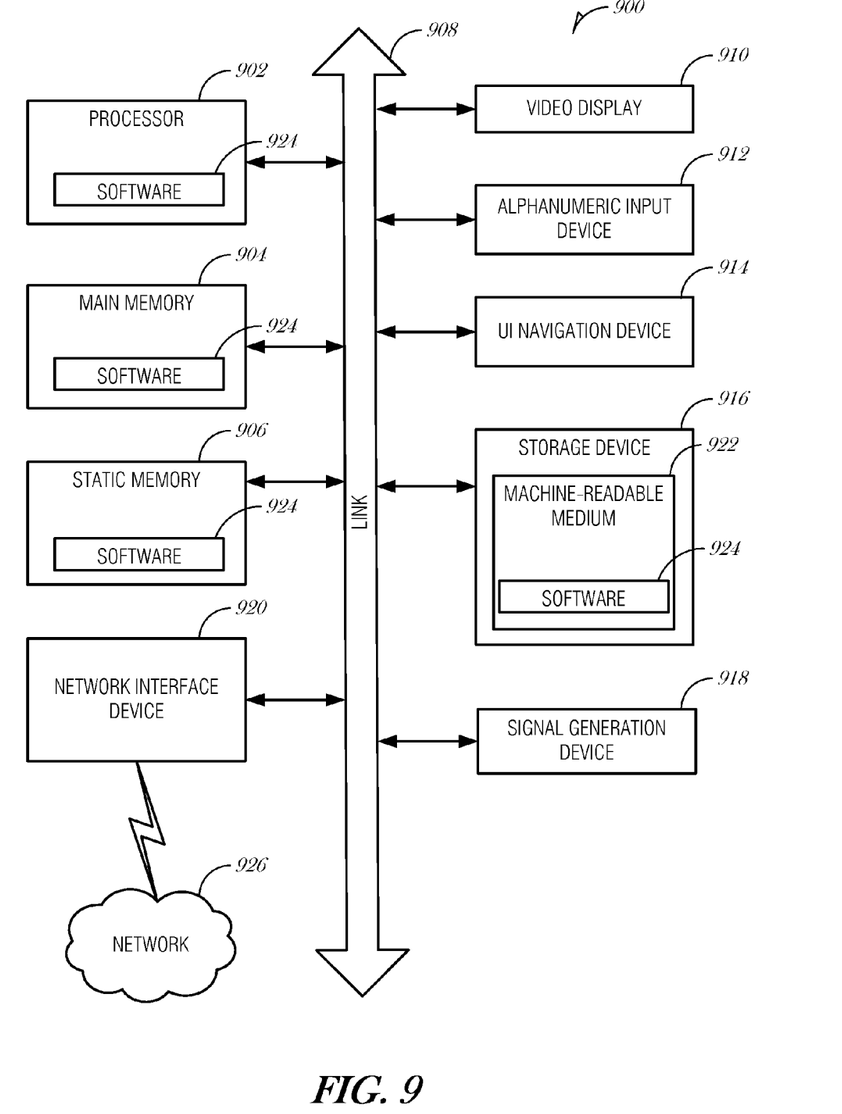
FIG. 9 is a block diagram illustrating an example machine upon which any one or more of the techniques (e.g., methodologies) discussed herein may perform, according to an example embodiment.

FIG. 9 is a block diagram illustrating a machine in the example form of a computer system 900, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, set-top box, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 900 includes at least one processor 902 (e.g., a central processing unit (CPU), a graphics processing unit (GPU) or both, processor cores, compute nodes, etc.), a main memory 904 and a static memory 906, which communicate with each other via a link 908 (e.g., bus). The computer system 900 may further include a video display unit 910, an alphanumeric input device 912 (e.g., a keyboard), and a user interface (UI) navigation device 914 (e.g., a mouse). In one embodiment, the video display unit 910, input device 912 and UI navigation device 914 are incorporated into a touch screen display. The computer system 900 may additionally include a storage device 916 (e.g., a drive unit), a signal generation device 918 (e.g., a speaker), a network interface device 920, and one or more sensors (not shown), such as a global positioning system (GPS) sensor, compass, accelerometer, or other sensor.

The storage device 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904, static memory 906, and/or within the processor 902 during execution thereof by the computer system 900, with the main memory 904, static memory 906, and the processor 902 also constituting machine-readable media.

While the machine-readable medium 922 is illustrated in an example embodiment to be a single medium, the term "machine-readable medium" may include a single medium or multiple media (e.g., a centralized or distributed database, and/or associated caches and servers) that store the one or more instructions 924. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 includes subject matter (such as a device, apparatus, or machine) for creating a stop-motion video comprising: an access module to access a series of frames of an input video; and a processing module to: determine whether each frame of the series of frames includes a portion of a move mechanism; and composite frames from the series of frames that do not include the portion of the move mechanism to render an output video.

In Example 2, the subject matter of Example 1 may include, wherein the move mechanism is a hand.

In Example 3, the subject matter of any one of Examples 1 to 2 may include, wherein to access the series of frames of the input video, the access module is to access the series of frames while the input video is being recorded.

In Example 4, the subject matter of any one of Examples 1 to 3 may include, wherein the processing module is to: pause the recording of the input video; obtain a first image; obtain a second image after the first image, the first and second images used as a portion of the output video; and resume the recording of the input video.

In Example 5, the subject matter of any one of Examples 1 to 4 may include, wherein the move mechanism is a hand, and wherein to determine whether each frame of the series of frames includes the portion of the hand, the processing module is to: identify the portion of the hand by recognizing a skin tone; and determine that a particular frame of the series of frames includes the portion of the hand based on the skin tone.

In Example 6, the subject matter of any one of Examples 1 to 5 may include, wherein the processing module is to initialize the skin tone by analyzing an image of the hand.

In Example 7, the subject matter of any one of Examples 1 to 6 may include, wherein the move mechanism is a hand, and wherein to determine whether each frame of the series of frames includes the portion of the hand, the processing module is to: detect motion of an object between two consecutive frames from the series of frames; determine that the object has a color similar to a skin tone; and determine that a particular frame of the series of frames includes the portion of the hand based on the skin tone.

In Example 8, the subject matter of any one of Examples 1 to 7 may include, wherein the processing module is to ignore motion between two consecutive frames when the motion is a result of a camera movement.

In Example 9, the subject matter of any one of Examples 1 to 8 may include, wherein the move mechanism is a hand, and wherein to determine whether each frame of the series of frames includes the portion of the hand, the processing module is to: determine a baseline number of objects in a scene captured by the series of frames; and identify a frame from the series of frames that includes more objects than the baseline number of objects.

In Example 10, the subject matter of any one of Examples 1 to 9 may include, wherein the move mechanism is a hand, and wherein to determine whether each frame of the series of frames includes the portion of the hand, the processing module is to: determine a baseline complexity in a scene captured by the series of frames; and identify a frame from the series of frames that includes more complexity than the baseline complexity.

In Example 11, the subject matter of any one of Examples 1 to 10 may include, wherein the baseline complexity is a color complexity.

Example 12 includes subject matter (such as a method, means for performing acts, machine readable medium including instructions that when performed by a machine cause the machine to performs acts, or an apparatus to perform) for creating a stop-motion video comprising: accessing, at a computing device, a series of frames of an input video; determining, at the computing device, whether each frame of the series of frames includes a portion of a move mechanism; and compositing frames from the series of frames that do not include the portion of the move mechanism to render an output video.

In Example 13, the subject matter of Example 12 may include, wherein the move mechanism is a hand.

In Example 14, the subject matter of any one of Examples 12 to 13 may include, wherein accessing the series of frames of the input video is performed while the input video is being recorded.

In Example 15, the subject matter of any one of Examples 12 to 14 may include, pausing the recording of the input video; capturing a first image; capturing a second image after the first image, the first and second images used as a portion of the output video; and resuming the recording of the input video.

In Example 16, the subject matter of any one of Examples 12 to 15 may include, wherein the move mechanism is a hand, and wherein determining whether each frame of the series of frames includes the portion of the hand comprises: identifying the portion of the hand by recognizing a skin tone; and determining that a particular frame of the series of frames includes the portion of the hand based on the skin tone.

In Example 17, the subject matter of any one of Examples 12 to 16 may include, initializing the skin tone by analyzing an image of the hand.

In Example 18, the subject matter of any one of Examples 12 to 17 may include, wherein the move mechanism is a hand, and wherein determining whether each frame of the series of frames includes the portion of the hand comprises: detecting motion of an object between two consecutive frames from the series of frames; determining that the object has a color similar to a skin tone; and determining that a particular frame of the series of frames includes the portion of the hand based on the skin tone.

In Example 19, the subject matter of any one of Examples 12 to 18 may include, ignoring motion between two consecutive frames when the motion is a result of a camera movement.

In Example 20, the subject matter of any one of Examples 12 to 19 may include, wherein the move mechanism is a hand, and wherein determining whether each frame of the series of frames includes the portion of the hand comprises: determining a baseline number of objects in a scene captured by the series of frames; and identifying a frame from the series of frames that includes more objects than the baseline number of objects.

In Example 21, the subject matter of any one of Examples 12 to 20 may include, wherein the move mechanism is a hand, and wherein determining whether each frame of the series of frames includes the portion of the hand comprises: determining a baseline complexity in a scene captured by the series of frames; and identifying a frame from the series of frames that includes more complexity than the baseline complexity.

In Example 22, the subject matter of any one of Examples 12 to 21 may include, wherein the baseline complexity is a color complexity.

Example 23 includes at least one machine-readable medium including instructions, which when executed by a machine, cause the machine to perform operations of any of the Examples 12-22.

Example 24 includes an apparatus comprising means for performing any of the Examples 12-22.

Example 25 includes subject matter (such as a device, apparatus, or machine) for creating a stop-motion video comprising: means for accessing, at a computing device, a series of frames of an input video; means for determining, at the computing device, whether each frame of the series of frames includes a portion of a move mechanism; and means for compositing frames from the series of frames that do not include the portion of the move mechanism to render an output video.

In Example 26, the subject matter of Example 25 may include, wherein the move mechanism is a hand.

In Example 27, the subject matter of any one of Examples 25 to 26 may include, wherein accessing the series of frames of the input video is performed while the input video is being recorded.

In Example 28, the subject matter of any one of Examples 25 to 27 may include, means for pausing the recording of the input video; means for capturing a first image; means for capturing a second image after the first image, the first and second images used as a portion of the output video; and means for resuming the recording of the input video.

In Example 29, the subject matter of any one of Examples 25 to 28 may include, wherein the means for determining whether each frame of the series of frames includes the portion of the hand comprise: means for identifying the portion of the hand by recognizing a skin tone; and means for determining that a particular frame of the series of frames includes the portion of the hand based on the skin tone.

In Example 30, the subject matter of any one of Examples 25 to 29 may include, means for initializing the skin tone by analyzing an image of the hand.

In Example 31, the subject matter of any one of Examples 25 to 30 may include, wherein the means for determining whether each frame of the series of frames includes the portion of the hand comprise: means for detecting motion of an object between two consecutive frames from the series of frames; means for determining that the object has a color similar to a skin tone; and means for determining that a particular frame of the series of frames includes the portion of the hand based on the skin tone.

In Example 32, the subject matter of any one of Examples 25 to 31 may include, means for ignoring motion between two consecutive frames when the motion is a result of a camera movement.

In Example 33, the subject matter of any one of Examples 25 to 32 may include, wherein the means for determining whether each frame of the series of frames includes the portion of the hand comprise: means for determining a baseline number of objects in a scene captured by the series of frames; and means for identifying a frame from the series of frames that includes more objects than the baseline number of objects.

In Example 34, the subject matter of any one of Examples 25 to 33 may include, wherein the means for determining whether each frame of the series of frames includes the portion of the hand comprise: means for determining a baseline complexity in a scene captured by the series of frames; and means for identifying a frame from the series of frames that includes more complexity than the baseline complexity.

In Example 35, the subject matter of any one of Examples 25 to 34 may include, wherein the baseline complexity is a color complexity.

Example 36 includes subject matter (such as a device, apparatus, or machine) for creating a video comprising: an access module to access an input video; and a video processing module to: identify a physical object in the input video; track movement of the physical object in the input video to identify a path; identify a three-dimensional model of the physical object; and create an output video with the three-dimensional model in place of the physical object, the three-dimensional model following the path.

In Example 37, the subject matter of Example 36 may include, wherein to identify the physical object in the input video, the video processing module is to: prompt a user to hold the physical object; and capture an image of the physical object.

In Example 38, the subject matter of any one of Examples 36 to 37 may include, wherein to track movement of the physical object the video processing module is to track orientation of the physical object.

In Example 39, the subject matter of any one of Examples 36 to 38 may include, wherein to track orientation of the physical object, the video processing module is to: identify a key point on the physical object; and track the key point.

In Example 40, the subject matter of any one of Examples 36 to 39 may include, wherein to identify the three-dimensional model of the physical object, the video processing module is to: prompt a user to identify the three-dimensional model; and receive an identification of the three-dimensional model from the user.

In Example 41, the subject matter of any one of Examples 36 to 40 may include, wherein to identify the three-dimensional model of the physical object, the video processing module is to: identify the three-dimensional model of the physical object automatically based on the identifying the physical object in the input video.

In Example 42, the subject matter of any one of Examples 36 to 41 may include, wherein to create an output video with the three-dimensional model in place of the physical object, the video processing module is to: identify a background image; and render the three-dimensional model over the background image following the path.

In Example 43, the subject matter of any one of Examples 36 to 42 may include, wherein to create an output video with the three-dimensional model in place of the physical object, the video processing module is to: identify a portion of a hand in the input video; and mask the portion of the hand in the output video.

Example 44 includes subject matter (such as a method, means for performing acts, machine readable medium including instructions that when performed by a machine cause the machine to performs acts, or an apparatus to perform) for creating a video comprising: accessing, at a computing device, an input video; identifying a physical object in the input video; tracking movement of the physical object in the input video to identify a path; identifying a three-dimensional model of the physical object; and creating an output video with the three-dimensional model in place of the physical object, the three-dimensional model following the path.

In Example 45, the subject matter of Example 44 may include, wherein identifying the physical object in the input video comprises: prompting a user to hold the physical object; and capturing an image of the physical object.

In Example 46, the subject matter of any one of Examples 44 to 45 may include, wherein tracking movement of the physical object comprises tracking orientation of the physical object.

In Example 47, the subject matter of any one of Examples 44 to 46 may include, wherein tracking orientation of the physical object comprises: identifying a key point on the physical object; and tracking the key point.

In Example 48, the subject matter of any one of Examples 44 to 47 may include, wherein identifying the three-dimensional model of the physical object comprises: prompting a user to identify the three-dimensional model; and receiving an identification of the three-dimensional model from the user.

In Example 49, the subject matter of any one of Examples 44 to 48 may include, wherein identifying the three-dimensional model of the physical object comprises: identifying the three-dimensional model of the physical object automatically based on the identifying the physical object in the input video.

In Example 50, the subject matter of any one of Examples 44 to 49 may include, wherein creating an output video with the three-dimensional model in place of the physical object comprises: identifying a background image; and rendering the three-dimensional model over the background image following the path.

In Example 51, the subject matter of any one of Examples 44 to 50 may include, wherein creating an output video with the three-dimensional model in place of the physical object comprises: identifying a portion of a hand in the input video; and masking the portion of the hand in the output video.

Example 52 includes at least one machine-readable medium including instructions, which when executed by a machine, cause the machine to perform operations of any of the Examples 44-51.

Example 53 includes an apparatus comprising means for performing any of the Examples 44-51.

Example 54 includes subject matter (such as a device, apparatus, or machine) for creating a video comprising: means for accessing, at a computing device, an input video; means for identifying a physical object in the input video; means for tracking movement of the physical object in the input video to identify a path; means for identifying a three-dimensional model of the physical object; and means for creating an output video with the three-dimensional model in place of the physical object, the three-dimensional model following the path.

In Example 55, the subject matter of Example 54 may include, wherein the means for identifying the physical object in the input video comprise: means for prompting a user to hold the physical object; and means for capturing an image of the physical object.

In Example 56, the subject matter of any one of Examples 54 to 55 may include, wherein the means for tracking movement of the physical object comprise means for tracking orientation of the physical object.

In Example 57, the subject matter of any one of Examples 54 to 56 may include, wherein the means for tracking orientation of the physical object comprise: means for identifying a key point on the physical object; and means for tracking the key point.

In Example 58, the subject matter of any one of Examples 54 to 57 may include, wherein the means for identifying the three-dimensional model of the physical object comprise: means for prompting a user to identify the three-dimensional model; and means for receiving an identification of the three-dimensional model from the user.

In Example 59, the subject matter of any one of Examples 54 to 58 may include, wherein the identifying the three-dimensional model of the physical object comprise: means for identifying the three-dimensional model of the physical object automatically based on the identifying the physical object in the input video.

In Example 60, the subject matter of any one of Examples 54 to 59 may include, wherein the means for creating an output video with the three-dimensional model in place of the physical object comprise: means for identifying a background image; and means for rendering the three-dimensional model over the background image following the path.

In Example 61, the subject matter of any one of Examples 54 to 60 may include, wherein the means for creating an output video with the three-dimensional model in place of the physical object comprise: means for identifying a portion of a hand in the input video; and means for masking the portion of the hand in the output video.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for creating a stop-motion video, the system comprising:
   an access module to access a series of frames of an input video; and
   a processing module to:
      perform image analysis of a given frame in the series of frames to determine whether the given frame includes a portion of a move mechanism, wherein the move mechanism is a hand, and wherein to determine whether the given frame of the series of frames includes the portion of the hand, the processing module is to determine a baseline number of objects in a scene captured by the series of frames, identify a number of objects in each frame from the series of frames, determine that frames including more objects than the baseline number of objects are frames that include the move mechanism, and determine that frames including up to the baseline number of objects are frames that do not include the move mechanism;
      identify frames of the series that include the move mechanism;
      create an output video based on the input video by removing from the input video the identified frames of the series that include the move mechanism; and
      render the output video with the frames that do not include the portion of the move mechanism.

2. The system of claim 1, wherein to access the series of frames of the input video, the access module is to access the series of frames while the input video is being recorded.

3. The system of claim 2, wherein the processing module is to:
   pause the recording of the input video;
   obtain a first image;
   obtain a second image after the first image, the first and second images used as a portion of the output video; and
   resume the recording of the input video.

4. A method of creating a stop-motion video, the method comprising:
   accessing, at a computing device, a series of frames of an input video;
   performing, at the computing device, image analysis of a given frame to determine whether the given frame includes a portion of a move mechanism, wherein the move mechanism is a hand, and wherein determining whether the given frame of the series of frames includes the portion of the hand comprises determining a baseline number of objects in a scene captured by the series of frames, identifying a number of objects in each frame from the series of frames, determining that frames including more objects than the baseline number of objects are frames that include the move mechanism, and determining that frames including up to the baseline number of objects are frames that do not include the move mechanism;
   identifying frames of the series that include the move mechanism;
   creating an output video based on the input video by removing from the input video the identified frames of the series that Include the move mechanism; and
   rendering the output video with the frames that do not include the portion of the move mechanism.

5. The method of claim 4, wherein accessing the series of frames of the input video is performed while the input video is being recorded.

6. The method of claim 5, further comprising:
   pausing the recording of the input video;
   capturing a first image;
   capturing a second image after the first image, the first and second images used as a portion of the output video; and
   resuming the recording of the input video.

7. At least one non-transitory machine-readable medium including instructions for creating a stop-motion video, which when executed by a machine, cause the machine to:
   access, at a computing device, a series of frames of an input video;
   perform image analysis of a given frame to determine, at the computing device, whether the given frame of the series of frames includes a portion of a hand, wherein the move mechanism is a hand, and wherein to determine whether the given frame of the series of frames includes the portion of the hand, the instructions to perform image analysis of a given frame to determine whether the given frame of the series of frames includes the portion of a hand comprises instructions to determine a baseline number of objects in a scene captured by the series of frames, identify a number of objects in each frame from the series of frames, determine that frames including more objects than the baseline number of objects are frames that include the move mechanism, and determine that frames including up to the baseline number of objects are frames that do not include the move mechanism;
   identify frames of the series that include the portion of the hand;
   create an output video based on the input video by removing from the input video the identified frames of the series that include the portion of the hand; and
   render the output video with the frames that do not include the portion of the hand.

8. The at least one machine-readable medium of claim 7, wherein the instructions to access the series of frames of the input video are performed while the input video is being recorded.

9. The at least one machine-readable medium of claim 8, further comprising instructions to:
- pause the recording of the input video;
- capture a first image;
- capture a second image after the first image, the first and second images used as a portion of the output video; and
- resume the recording of the input video.

* * * * *